(No Model.)

J. D. ENAS.
VINE PLANTER.

No. 307,532. Patented Nov. 4, 1884.

Witnesses,
Geo. H. Strong

Inventor,
Jos. D. Enas
By Dewey & Co.
Attorneys

UNITED STATES PATENT OFFICE.

JOSEPH D. ENAS, OF NAPA CITY, CALIFORNIA.

VINE-PLANTER.

SPECIFICATION forming part of Letters Patent No. 307,532, dated November 4, 1884.

Application filed June 2, 1884. (No model.)

*To all whom it may concern:*

Be it known that I, JOSEPH D. ENAS, of Napa City, county of Napa, and State of California, have invented an Improvement in Vine-Planters; and I hereby declare the following to be a full, clear, and exact description thereof.

My invention relates to a new and useful implement for vine-planting; and it consists of an elongated narrow tapering blade bent to form an angle on a central longitudinal line, whereby it is given an angularly-concaved face and an angularly-convexed back. The upper end of the blade is secured to foot-rest strips, the ends of which project beyond the sides of the blade, and a suitable handle is riveted to the blade after the manner of ordinary spades or shovels.

The object of my invention is to provide an implement which can readily be thrust into the ground, and by a reciprocating movement of its handle will displace the earth sufficiently to permit the insertion of the vine, and which, while still in the earth, serves, by reason of its central angle, to afford an accurate guide for the proper location of the vine.

Figure 3:
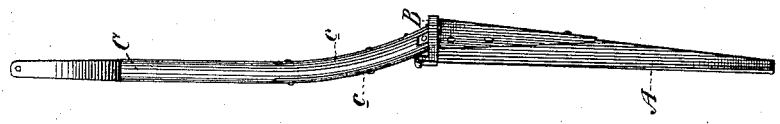
Figures 4, 5:
Figure 2:
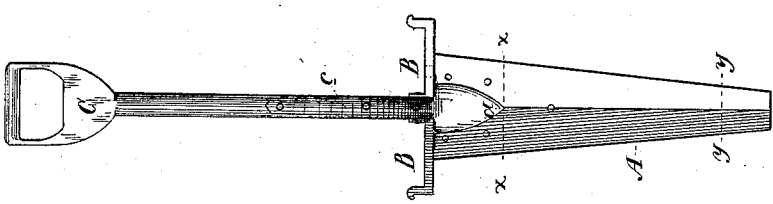
Figure 1:
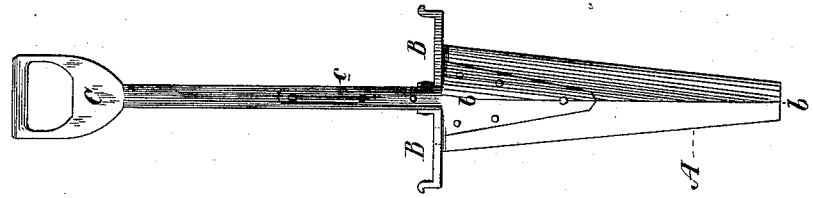

Referring to the accompanying drawings, Figure 1 is a rear elevation of my vine-planter. Fig. 2 is a front elevation of same. Fig. 3 is a side view of same. Fig. 4 is a transverse section of the blade near the top. Fig. 5 is a similar section near the bottom.

A is the blade, made of suitable metal. It is elongated and narrow, and tapers gently to the bottom. Its length is, for practical purposes, about twenty inches, in order to displace the earth to a sufficient depth for planting the vine. Its width above is about six inches, and below about two inches, which renders it easy to push it into the ground. The blade is bent to form an angle on a central longitudinal line (represented in Fig. 2 by line $a\ a$) on the face of the blade, which is angularly concaved. The back of the blade is correspondingly angularly convexed or bent, the angle being formed on a central longitudinal raised line, ($b\ b$ in Fig. 1.) This angularity of the blade is greater at the top than near its bottom, toward which it gradually diminishes, as will be seen by a comparison of the sections, Figs. 4 and 5.

B are foot-rests, consisting of suitable flat metal strips having upturned outer ends. These strips are slotted longitudinally above the outer edges of the blade, and these edges are fitted through the slots and riveted down. The outer ends of the strip or foot-rest extend beyond the sides of the blade to afford a good bearing for the pressure of the foot, and their inner ends are suitably secured.

C is the handle, united to the blade by the usual iron straps, $c$, on the front and back, after the manner of ordinary spades and shovels.

The use of the implement is as follows: It is first driven into the ground within an inch of the stake, and on that side where the vine or cutting is to be set out. The handle is then drawn toward the operator, which has the effect of displacing the earth near the top. Then the handle is forced toward the stake, which displaces the earth at the bottom, thus leaving a hole in the ground within the concaved face of the blade. The vine is then taken and put down in the hole, and its location is accurately determined by the line $a\ a$, which acts as a guide for placing each vine, and in this manner the whole row may be made straight, as the blade itself is each time inserted in the proper place.

The angular face and back of the blade has a better effect in displacing the earth, and also in entering it, than a flat blade or even a curved blade, and its narrow tapering shape renders it well adapted for the object intended.

Having thus described my invention, what I claim as new, and desire to secure by Letters Patent, is—

A vine-planter consisting of the elongated narrow blade A, tapering from top to bottom, and bent to form an angle at its longitudinal center, the slotted foot-rest strip B, to which the top of the blade is riveted, said strip provided with upturned ends and having its ends projecting beyond the sides of the blades, and the handle C, riveted to the top of the blade by suitable irons, substantially as herein described.

In witness whereof I have hereunto set my hand.

JOSEPH D. ENAS.

Witnesses:
S. H. NOURSE,
C. D. COLE.